United States Patent
Sasaki et al.

(10) Patent No.: US 10,406,787 B2
(45) Date of Patent: Sep. 10, 2019

(54) MULTILAYER STRUCTURE AND PACKAGING MATERIAL INCLUDING SAME

(71) Applicant: KURARAY CO., LTD., Kurashiki-shi (JP)

(72) Inventors: Ryoichi Sasaki, Kurashiki (JP); Yasutaka Inubushi, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 108 days.

(21) Appl. No.: 15/539,265

(22) PCT Filed: Dec. 24, 2015

(86) PCT No.: PCT/JP2015/006454
§ 371 (c)(1),
(2) Date: Jun. 23, 2017

(87) PCT Pub. No.: WO2016/103715
PCT Pub. Date: Jun. 30, 2016

(65) Prior Publication Data
US 2018/0009202 A1 Jan. 11, 2018

(30) Foreign Application Priority Data
Dec. 24, 2014 (JP) ................. 2014-261114

(51) Int. Cl.
| | | |
|---|---|---|
| *B65D 65/40* | (2006.01) | |
| *B32B 27/08* | (2006.01) | |
| *B32B 27/32* | (2006.01) | |
| *B32B 27/36* | (2006.01) | |
| *B32B 27/34* | (2006.01) | |
| *B32B 7/12* | (2006.01) | |
| *B32B 27/26* | (2006.01) | |
| *B32B 27/10* | (2006.01) | |
| *B32B 27/00* | (2006.01) | |
| *B65D 81/24* | (2006.01) | |
| *B65D 85/50* | (2006.01) | |

(52) U.S. Cl.
CPC ............ *B32B 27/08* (2013.01); *B32B 7/12* (2013.01); *B32B 27/10* (2013.01); *B32B 27/32* (2013.01); *B32B 27/34* (2013.01); *B32B 27/36* (2013.01); *B65D 65/40* (2013.01); *B65D 81/24* (2013.01); *B65D 85/50* (2013.01); *B32B 2250/03* (2013.01); *B32B 2250/24* (2013.01); *B32B 2255/10* (2013.01); *B32B 2255/12* (2013.01); *B32B 2255/26* (2013.01); *B32B 2255/28* (2013.01); *B32B 2307/306* (2013.01); *B32B 2307/7244* (2013.01); *B32B 2307/7246* (2013.01); *B32B 2307/748* (2013.01); *B32B 2439/40* (2013.01); *B32B 2439/70* (2013.01)

(58) Field of Classification Search
None
See application file for complete search history.

(56) References Cited

U.S. PATENT DOCUMENTS

| | | | |
|---|---|---|---|
| 2013/0034674 A1* | 2/2013 | Yoshida | ............... C09D 123/02 428/35.2 |
| 2014/0248500 A1 | 9/2014 | Yoshida et al. | |

FOREIGN PATENT DOCUMENTS

| | | |
|---|---|---|
| EP | 3 121 000 A1 | 1/2017 |
| JP | 2003-251732 A | 9/2003 |
| JP | 2013-169704 A | 9/2013 |
| JP | 2013-208793 A | 10/2013 |
| JP | 2013-208794 A | 10/2013 |
| JP | 2013-208915 A | 10/2013 |
| WO | 2011/122036 A1 | 10/2011 |
| WO | 2013/051287 A1 | 4/2013 |

OTHER PUBLICATIONS

International Search Report dated Apr. 5, 2016 in PCT/JP2015/006454 filed Dec. 24, 2015.
Extended European Search Report dated Jul. 24, 2018 in Patent Application No. 15872286.8.

* cited by examiner

*Primary Examiner* — Sheeba Ahmed
(74) *Attorney, Agent, or Firm* — Oblon, McClelland, Maier & Neustadt, L.L.P.

(57) ABSTRACT

The present invention provides a novel multilayer structure having good gas barrier properties and good water vapor barrier properties and further having high retort resistance and a packaging material including the multilayer structure. The present invention relates to a multilayer structure including a base (X) and a layer (Y) stacked on the base (X). The layer (Y) contains an aluminum-containing compound (A) and an organic phosphorus compound (BO), and the organic phosphorus compound (BO) contains a phosphorus atom-containing functional group and at least one metal ion (Z) selected from ions of metals of Groups 1 to 12 of the periodic table, the content of the metal ion (Z) being 0.4 to 8.0 mol % relative to the content of the phosphorus atom-containing functional group.

9 Claims, 2 Drawing Sheets

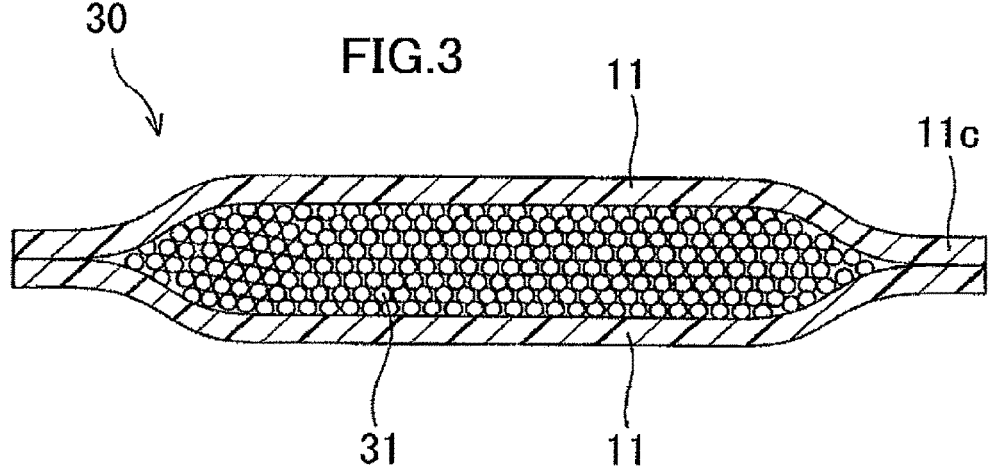
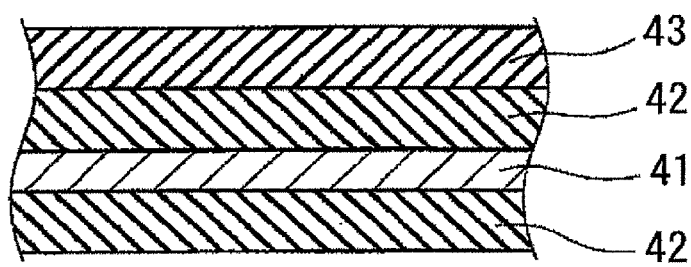

MULTILAYER STRUCTURE AND PACKAGING MATERIAL INCLUDING SAME

TECHNICAL FIELD

The present invention relates to a multilayer structure and a packaging material including the multilayer structure.

BACKGROUND ART

Layered products in which a gas barrier layer containing aluminum or aluminum oxide as a component is formed on a plastic film have been conventionally well-known. Such layered products are used as packaging materials for protecting articles (such as foods) which are susceptible to quality change induced by oxygen. In many cases, such a gas barrier layer is formed on a plastic film by a dry process such as physical vapor deposition (PVD) or chemical vapor deposition (CVD).

For example, aluminum-deposited films have light shielding properties as well as gas barrier properties and are typically used as packaging materials for dry foods.

Aluminum oxide-deposited films, which have transparency, are characterized by allowing visual recognition of contained substances and by enabling check for foreign matters with a metal detector and heating with a microwave oven. These films are thus used as packaging materials in a wide variety of applications such as retort food packaging.

For example, Patent Literature 1 discloses a composite structure having a gas barrier layer containing aluminum, the composite structure having a transparent gas barrier layer composed of aluminum atoms, oxygen atoms, and sulfur atoms. Patent Literature 1 discloses a method for forming the transparent gas barrier layer by reactive sputtering.

In addition, Patent Literature 2 discloses a composite structure having a gas barrier layer containing aluminum oxide, the composite structure having a transparent gas barrier layer composed of a reaction product of aluminum oxide particles and a phosphorus compound. Patent Literature 2 discloses a method for forming the gas barrier layer, in which a coating liquid containing aluminum oxide particles and a phosphorus compound is applied onto a plastic film, then dried and heat-treated.

Such conventional composite structures having a gas barrier layer have good initial gas barrier properties; however, when they are exposed to physical stresses such as deformation and impact, the gas barrier layer may suffer from defects such as cracks and pinholes which lead to deterioration in gas barrier properties.

Under such circumstances, Patent Literature 3 and Patent Literature 4 have proposed multilayer structures that not only have good gas barrier properties but also are capable of maintaining the gas barrier properties at a high level even when exposed to physical stresses such as deformation and impact.

However, when conventional multilayer structures as disclosed in Patent Literature 3 and Patent Literature 4 are used as packaging materials for retort foods, the multilayer structures may experience a decrease in interlayer adhesion and suffer from appearance defects such as delamination after retorting.

Thus, a gas-barrier multilayer structure that maintains good properties even after retorting has been demanded.

CITATION LIST

Patent Literature

Patent Literature 1: JP 2003-251732 A
Patent Literature 2: WO 2011/122036 A1
Patent Literature 3: JP 2013-208794 A
Patent Literature 4: JP 2013-208793 A

SUMMARY OF INVENTION

Technical Problem

An object of the present invention is to provide a novel multilayer structure having good gas barrier properties and good water vapor barrier properties and further having high retort resistance and a packaging material including the multilayer structure.

Solution to Problem

As a result of a detailed study, the present inventors have found that a multilayer structure including particular layers meets the above object, and has made the present invention on the basis of the finding.

The present invention provides a multilayer structure including a base (X) and a layer (Y) stacked on the base (X), wherein the layer (Y) contains an aluminum-containing compound (A) and an organic phosphorus compound (BO), and the organic phosphorus compound (BO) contains a phosphorus atom-containing functional group and at least one metal ion (Z) selected from ions of metals of Groups 1 to 12 of the periodic table, the content of the metal ion (Z) being 0.4 to 8.0 mol % relative to the content of the phosphorus atom-containing functional group.

In the multilayer structure of the present invention, the aluminum-containing compound (A) may be a compound (Ab) including a reaction product (D) of an aluminum-containing metal oxide (Aa) and an inorganic phosphorus compound (BI).

In the multilayer structure of the present invention, a ratio $W_{BO}/W_{BI}$ between a weight $W_{BI}$ of the inorganic phosphorus compound (BI) and a weight $W_{BO}$ of the organic phosphorus compound (BO) in the layer (Y) satisfies a relationship of $0.01/99.99 \leq W_{BO}/W_{BI} < 1.00/99.00$.

In the multilayer structure of the present invention, the organic phosphorus compound (BO) may be a polymer having at least one functional group selected from the group consisting of a phosphoric acid group, a phosphorous acid group, a phosphonic acid group, a phosphonous acid group, a phosphinic acid group, and a phosphinous acid group.

The metal ion (Z) may be at least one metal ion selected from the group consisting of a lithium ion, a potassium ion, a sodium ion, a magnesium ion, a calcium ion, a manganese ion, an iron ion, a cobalt ion, a nickel ion, a copper ion, and a zinc ion.

In the multilayer structure of the present invention, the base (X) may include at least one layer selected from the group consisting of a thermoplastic resin film layer and a paper layer.

The present invention also provides a packaging material including any one of the multilayer structures as defined above.

The packaging material may be used for a retort food.

Advantageous Effects of Invention

The present invention makes it possible to obtain a novel multilayer structure having good gas barrier properties, good water vapor barrier properties, and high retort resistance and a packaging material including the multilayer structure. That is, the present invention makes it possible to obtain: a novel multilayer structure that not only has good gas barrier properties and good water vapor barrier properties but also is capable of maintaining good gas barrier properties and good water vapor barrier properties even after retorting, has good interlayer adhesion (peel strength) and suffers from no appearance defect such as delamination after retorting; and a packaging material including the multilayer structure.

BRIEF DESCRIPTION OF DRAWINGS

FIG. 3 is a cross-sectional view of a vacuum insulator according to an embodiment of the present invention.

FIG. 4 is a partial cross-sectional view of an electronic device according to an embodiment of the present invention.

DESCRIPTION OF EMBODIMENTS

Figure 1:
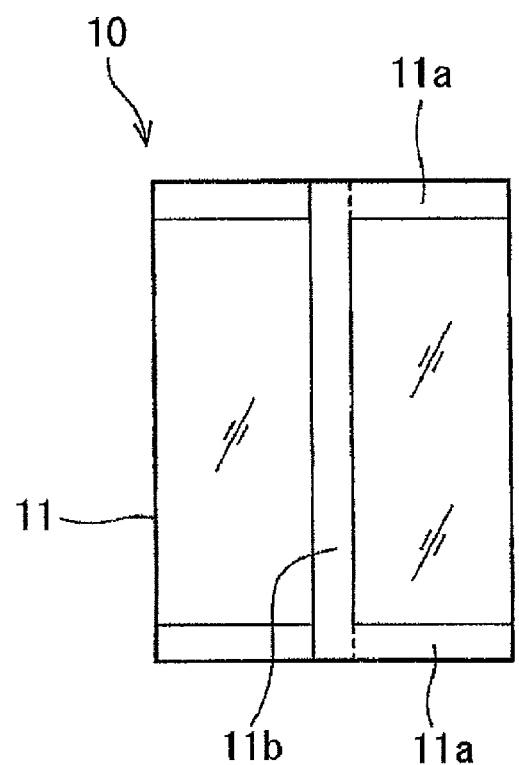
FIG. 1 is a schematic diagram of a vertical form-fill-seal bag according to an embodiment of the present invention.

Hereinafter, the present invention will be described with reference to examples. The following description gives examples of materials, conditions, techniques, and value ranges; however, the present invention is not limited to those mentioned as examples. The materials given as examples may be used alone or may be used in combination with one another, unless otherwise specified.

Unless otherwise specified, the meaning of an expression like "a particular layer is stacked on a particular member (such as a base or layer)" as used herein encompasses not only the case where the particular layer is stacked in contact with the member but also the case where the particular layer is stacked above the member, with another layer interposed therebetween. The same applies to expressions like "a particular layer is formed on a particular member (such as a base or layer)" and "a particular layer is disposed on a particular member (such as a base or layer)". Unless otherwise specified, the meaning of an expression like "a liquid (such as a coating liquid) is applied onto a particular member (such as a base or layer)" encompasses not only the case where the liquid is applied directly to the member but also the case where the liquid is applied to another layer formed on the member.

Herein, a layer may be termed "layer (Y)" using a reference character "(Y)" to differentiate the layer from other layers. The reference character "(Y)" has no technical meaning, unless otherwise specified. The same applies to other reference characters used in the terms such as "base (X)" and "compound (A)". However, an exception is made for the terms such as "hydrogen atom (H)" in which the reference character obviously represents a specific element.

[Multilayer Structure]

The multilayer structure of the present invention includes a base (X) and a layer (Y) containing aluminum. The layer (Y) contains an aluminum-containing compound (A) (which hereinafter may be simply referred to as "compound (A)") and an organic phosphorus compound (BO), and the organic phosphorus compound (BO) contains a phosphorus atom-containing functional group and a metal ion (Z) that is an ion of a metal belonging to Groups 1 to 12 of the periodic table, the content of the metal ion (Z) being 0.4 to 8.0 mol % relative to the content of the phosphorus atom-containing functional group. The term "multilayer structure" as used in the following description refers to a multilayer structure that includes the base (X) and the layer (Y), unless otherwise specified.

In the layer (Y), at least a part of the compound (A) and at least a part of the organic phosphorus compound (BO) may react with each other. When the layer (Y) contains an inorganic phosphorus compound (BI), at least a part of the compound (A) may react with at least a part of the organic phosphorus compound (BO) and/or inorganic phosphorus compound (BI). When the compound (A) has undergone a reaction in the layer (Y), a moiety derived from the compound (A) in the reaction product is regarded as the compound (A). In this case, the weight of the compound (A) used in the formation of the reaction product (the weight of the compound (A) that has yet to undergo the reaction) is included in the weight of the compound (A) in the layer (Y). When the inorganic phosphorus compound (BI) and/or organic phosphorus compound (BO) has undergone a reaction in the layer (Y), a moiety derived from the inorganic phosphorus compound (BI) and/or organic phosphorus compound (BO) in the reaction product is regarded as the inorganic phosphorus compound (BI) and/or organic phosphorus compound (BO). In this case, the weight of the inorganic phosphorus compound (BI) and/or organic phosphorus compound (BO) used in the formation of the reaction product (the weight of the inorganic phosphorus compound (BI) and/or organic phosphorus compound (BO) that has yet to undergo the reaction) is included in the weight of the inorganic phosphorus compound (BI) and/or organic phosphorus compound (BO) in the layer (Y).

[Base (X)]

The material of the base (X) is not particularly limited, and a base made of any of various materials can be used. Examples of the material of the base (X) include: resins such as thermoplastic resins and thermosetting resins; fiber assemblies such as fabrics and paper; wood; and glass. Among these, thermoplastic resins and fiber assemblies are preferred, and thermoplastic resins are more preferred. The form of the base (X) is not particularly limited. The base (X) may be a laminar base such as a film or sheet. The base (X) preferably includes at least one layer selected from the group consisting of a thermoplastic resin film layer and a paper layer, more preferably includes a thermoplastic resin film layer, and is even more preferably a thermoplastic resin film layer.

Examples of thermoplastic resins that may be used in the base (X) include: polyolefin resins such as polyethylene and polypropylene; polyester resins such as polyethylene terephthalate (PET), polyethylene-2,6-naphthalate, polybutylene terephthalate, and copolymers thereof; polyamide resins such as nylon-6, nylon-66, and nylon-12; hydroxy group-containing polymers such as polyvinyl alcohol and ethylene-vinyl alcohol copolymer; polystyrene; poly(meth)acrylic acid esters; polyacrylonitrile; polyvinyl acetate; polycarbonate; polyarylate; regenerated cellulose; polyimide; polyetherimide; polysulfone; polyethersulfone; polyetheretherketone; and ionomer resins. When the multilayer structure is used as or in a packaging material, the material of the base (X) is preferably at least one thermoplastic resin selected from the group consisting of polyethylene, polypropylene, polyethylene terephthalate, nylon-6, and nylon-66.

When a film made of such a thermoplastic resin is used as the base (X), the base (X) may be an oriented film or non-oriented film. In terms of high suitability for processes (such as printing and lamination) of the resulting multilayer structure, an oriented film, particularly a biaxially-oriented film, is preferred. The biaxially-oriented film may be a biaxially-oriented film produced by any one method selected from simultaneous biaxial stretching, sequential biaxial stretching, and tubular stretching.

Examples of paper that may be used in the base (X) include kraft paper, high-quality paper, simili paper, glassine paper, parchment paper, synthetic paper, white paperboard, manila board, milk carton board, cup paper, and ivory paper. The use of paper in the base (X) makes it possible to obtain a multilayer structure for a paper container.

When the base (X) is in the form of a layer, the thickness of the base (X) is preferably 1 to 1,000 μm, more preferably 5 to 500 μm, and even more preferably 9 to 200 μm, in terms of high mechanical strength and good processability of the resulting multilayer structure.

[Layer (Y)]

The layer (Y) contains the compound (A) and the organic phosphorus compound (BO). The compound (A) is an aluminum-containing compound. It is preferable for the layer (Y) to further contain an inorganic phosphorus compound (BI). The inorganic phosphorus compound (BI) and organic phosphorus compound (BO) have a functional group containing a phosphorus atom. The compound (A), the inorganic phosphorus compound (BI), and the organic phosphorus compound (BO) will now be described.

[Aluminum-containing Compound (A)]

The compound (A) may be an aluminum-containing metal oxide (Aa) or a compound (Ab) including a reaction product (D) formed by a reaction between the aluminum-containing metal oxide (Aa) (which hereinafter may be simply referred to as "metal oxide (Aa)") and the inorganic phosphorus compound (BI) (such a compound including the reaction product (D) may hereinafter be simply referred to as "compound (Ab)").

[Aluminum-containing Metal Oxide (Aa)]

The aluminum-containing metal oxide (Aa) is typically in the form of particles when reacted with the inorganic phosphorus compound (BI).

The metal atoms constituting the aluminum-containing metal oxide (Aa) (the metal atoms may be collectively referred to as "metal atoms (M)") include at least one metal atom selected from atoms of metals belonging to Groups 2 to 14 of the periodic table, and include at least aluminum atoms. The metal atoms (M) may consist only of aluminum atoms or may include aluminum atoms and other metal atoms. A combination of two or more metal oxides (Aa) may be used as the metal oxide (Aa).

The proportion of aluminum atoms in the metal atoms (M) is typically 50 mol % or more, and may be 60 mol % to 100 mol % or 80 mol % to 100 mol %. Examples of the metal oxide (Aa) include metal oxides produced by methods such as liquid-phase synthesis, gas-phase synthesis, and solid grinding.

The metal oxide (Aa) may be a hydrolytic condensate of a compound (E) containing the metal atom (M) to which a hydrolyzable characteristic group is bonded. Examples of the characteristic group include Win the general formula [I] described below. The hydrolytic condensate of the compound (E) can be regarded substantially as a metal oxide. Thus, the hydrolytic condensate of the compound (E) may be referred to as "metal oxide (Aa)" herein. That is, the term "metal oxide (Aa)" as used herein is interchangeable with the term "hydrolytic condensate of the compound (E)", while the term "hydrolytic condensate of the compound (E)" as used herein is interchangeable with the term "metal oxide (Aa)".

[Compound (E) Containing Metal Atom (M) to which Hydrolyzable Characteristic Group is Bonded]

In terms of ease of control of reaction with the inorganic phosphorus compound (BI) and in terms of good gas barrier properties of the resulting multilayer structure, the compound (E) preferably includes at least one compound (Ea) represented by the following general formula [I].

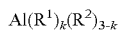

$$Al(R^1)_k(R^2)_{3-k} \qquad [I]$$

In this formula, $R^1$ is a halogen atom (such as a fluorine atom, chlorine atom, bromine atom, or iodine atom), $NO_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. $R^2$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 6 to 10 carbon atoms. k is an integer of 1 to 3. When there are two or more atoms or groups represented by $R^1$, the atoms or groups represented by $R^1$ may be the same as or different from each other. When there are two or more atoms or groups represented by $R^2$, the atoms or groups represented by $R^2$ may be the same as or different from each other.

The compound (E) may include, in addition to the compound (Ea), at least one compound (Eb) represented by the following general formula [II].

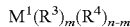

$$M^1(R^3)_m(R^4)_{n-m} \qquad [II]$$

In this formula, $M^1$ is at least one metal atom different from an aluminum atom and selected from atoms of metals belonging to Groups 2 to 14 of the periodic table. $R^3$ is a halogen atom (such as a fluorine atom, chlorine atom, bromine atom, or iodine atom), $NO_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. $R^4$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 6 to 10 carbon atoms. m is an integer of 1 to n. n is equal to the valence of $M^1$. When there are two or more atoms or groups represented by $R^3$, the atoms or groups represented by $R^3$ may be the same as or different from each other. When there are two or more atoms or groups represented by $R^4$, the atoms or groups represented by $R^4$ may be the same as or different from each other.

Examples of the alkoxy groups represented by $R^1$ and $R^3$ include methoxy, ethoxy, n-propoxy, isopropoxy, n-butoxy, isobutoxy, sec-butoxy, tert-butoxy, benzyloxy, diphenylmethoxy, trityloxy, 4-methoxybenzyloxy, methoxymethoxy, 1-ethoxyethoxy, benzyloxymethoxy, 2-trimethylsilylethoxy, 2-trimethylsilylethoxymethoxy, phenoxy, and 4-methoxyphenoxy groups.

Examples of the acyloxy groups represented by $R^1$ and $R^3$ include acetoxy, ethylcarbonyloxy, n-propylcarbonyloxy, isopropylcarbonyloxy, n-butylcarbonyloxy, isobutylcarbonyloxy, sec-butylcarbonyloxy, tert-butylcarbonyloxy, and n-octylcarbonyloxy groups.

Examples of the alkenyloxy groups represented by $R^1$ and $R^3$ include allyloxy, 2-propenyloxy, 2-butenyloxy, 1-methyl-2-propenyloxy, 3-butenyloxy, 2-methyl-2-propenyloxy, 2-pentenyloxy, 3-pentenyloxy, 4-pentenyloxy, 1-methyl-3-butenyloxy, 1,2-dimethyl-2-propenyloxy, 1,1-dimethyl-2-propenyloxy, 2-methyl-2-butenyloxy, 3-methyl-2-butenyloxy, 2-methyl-3-butenyloxy, 3-methyl-3-butenyloxy, 1-vinyl-2-propenyloxy, and 5-hexenyloxy groups.

Examples of the β-diketonato groups represented by $R^1$ and $R^3$ include 2,4-pentanedionato, 1,1,1-trifluoro-2,4-pentanedionato, 1,1,1,5,5,5-hexafluoro-2,4-pentanedionato, 2,2,6,6-tetramethyl-3,5-heptanedionato, 1,3-butanedionato, 2-methyl-1,3-butanedionato, 2-methyl-1,3-butanedionato, and benzoylacetonato groups.

Examples of the acyl groups of the diacylmethyl groups represented by $R^1$ and $R^3$ include: aliphatic acyl groups having 1 to 6 carbon atoms such as formyl, acetyl, propionyl (propanoyl), butyryl (butanoyl), valeryl (pentanoyl), and hexanoyl groups; and aromatic acyl (aroyl) groups such as benzoyl and toluoyl groups.

Examples of the alkyl groups represented by $R^2$ and $R^4$ include methyl, ethyl, n-propyl, isopropyl, n-butyl, isobutyl, sec-butyl, tert-butyl, n-pentyl, isopentyl, n-hexyl, isohexyl, 3-methylpentyl, 2-methylpentyl, 1,2-dimethylbutyl, cyclopropyl, cyclopentyl, and cyclohexyl groups.

Examples of the aralkyl groups represented by $R^2$ and $R^4$ include benzyl and phenylethyl (phenethyl) groups.

Examples of the alkenyl groups represented by $R^2$ and $R^4$ include vinyl, 1-propenyl, 2-propenyl, isopropenyl, 3-butenyl, 2-butenyl, 1-butenyl, 1-methyl-2-propenyl, 1-methyl-1-propenyl, 1-ethyl-1-ethenyl, 2-methyl-2-propenyl, 2-methyl-1-propenyl, 3-methyl-2-butenyl, and 4-pentenyl groups.

Examples of the aryl groups represented by $R^2$ and $R^4$ include phenyl, 1-naphthyl, and 2-naphthyl groups.

Examples of the substituents in $R^1$, $R^2$, $R^3$, and $R^4$ include: alkyl groups having 1 to 6 carbon atoms; alkoxy groups having 1 to 6 carbon atoms such as methoxy, ethoxy, n-propoxy, isopropoxy, n-butoxy, isobutoxy, sec-butoxy, tert-butoxy, n-pentyloxy, isopentyloxy, n-hexyloxy, cyclopropyloxy, cyclobutyloxy, cyclopentyloxy, and cyclohexyloxy groups; alkoxycarbonyl groups having 1 to 6 carbon atoms such as methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, n-pentyloxycarbonyl, isopentyloxycarbonyl, cyclopropyloxycarbonyl, cyclobutyloxycarbonyl, and cyclopentyloxycarbonyl groups; aromatic hydrocarbon groups such as phenyl, tolyl, and naphthyl groups; halogen atoms such as fluorine, chlorine, bromine, and iodine atoms; acyl groups having 1 to 6 carbon atoms; aralkyl groups having 7 to 10 carbon atoms; aralkyloxy groups having 7 to 10 carbon atoms; alkylamino groups having 1 to 6 carbon atoms; and dialkylamino groups having an alkyl group having 1 to 6 carbon atoms.

It is preferable for $R^1$ and $R^3$ to be a halogen atom, $NO_3$, an optionally substituted alkoxy group having 1 to 6 carbon atoms, an optionally substituted acyloxy group having 2 to 6 carbon atoms, an optionally substituted β-diketonato group having 5 to 10 carbon atoms, or a diacylmethyl group having an optionally substituted acyl group having 1 to 6 carbon atoms, and it is more preferable for $R^1$ and $R^3$ to be an optionally substituted alkoxy group having 1 to 6 carbon atoms.

It is preferable for $R^2$ and $R^4$ to be an optionally substituted alkyl group having 1 to 6 carbon atoms. It is preferable for k in the formula [I] to be 3.

It is preferable for $M^1$ to be an atom of a metal belonging to Group 4 of the periodic table, and it is more preferable for $M^1$ to be titanium or zirconium. When $M^1$ is an atom of a metal belonging to Group 4 of the periodic table, m in the formula [II] is preferably 4.

Boron and silicon are categorized herein as metals, although they may be classified as semimetals in other contexts.

Examples of the compound (Ea) include aluminum chloride, aluminum nitrate, aluminum acetate, tris(2,4-pentanedionato)aluminum, trimethoxyaluminum, triethoxyaluminum, tri-n-propoxyaluminum, triisopropoxyaluminum, tri-n-butoxyaluminum, tri-sec-butoxyaluminum, and tri-tert-butoxyaluminum. Among these, triisopropoxyaluminum and tri-sec-butoxyaluminum are preferred. A combination of two or more compounds (Ea) may be used as the compound (E).

Examples of the compound (Eb) include: titanium compounds such as tetrakis(2,4-pentanedionato)titanium, tetramethoxytitanium, tetraethoxytitanium, tetraisopropoxytitanium, tetra-n-butoxytitanium, and tetrakis(2-ethylhexoxy)titanium; and zirconium compounds such as tetrakis(2,4-pentanedionato)zirconium, tetra-n-propoxyzirconium, and tetra-n-butoxyzirconium. These may be used alone, or a combination of two or more thereof may be used as the compound (Eb).

The proportion of the compound (Ea) in the total amount of the compound (E) is not particularly limited as long as the effect of the present invention is obtained. For example, the proportion of the compound (e.g., the compound (Eb)) other than the compound (Ea) in the total amount of the compound (E) is preferably 20 mol % or less, more preferably 10 mol % or less, and even more preferably 5 mol % or less, and may be 0 mol %.

The compound (E) is hydrolyzed, so that at least some of the hydrolyzable characteristic groups of the compound (E) are converted to hydroxy groups. The hydrolysate is then condensed to form a compound in which the metal atoms (M) are linked together via an oxygen atom (O). The repetition of this condensation results in the formation of a compound that can be regarded substantially as a metal oxide. The thus formed metal oxide (Aa), in general, has hydroxy groups present on its surface.

A compound is categorized herein as the metal oxide (Aa) when the ratio, [the number of moles of the oxygen atoms (O) bonded only to the metal atoms (M)]/[the number of moles of the metal atoms (M)], is 0.8 or more in the compound. The "oxygen atom (O) bonded only to the metal atom (M)", as defined herein, refers to the oxygen atom (O) in the structure represented by M-O-M, and does not include an oxygen atom that is bonded to both the metal atom (M) and hydrogen atom (H) as is the case for the oxygen atom (O) in the structure represented by M-O—H. The above ratio in the metal oxide (Aa) is preferably 0.9 or more, more preferably 1.0 or more, and even more preferably 1.1 or more. The upper limit of this ratio is not particularly defined. When the valence of the metal atom (M) is denoted by n, the upper limit is typically expressed as n/2.

In order for the hydrolytic condensation to take place, it is important that the compound (E) has hydrolyzable characteristic groups. When there are no such groups bonded, hydrolytic condensation reaction does not occur or proceeds very slowly, which makes difficult the preparation of the metal oxide (Aa) intended.

The hydrolytic condensate of the compound (E) may be produced, for example, from a particular starting material by a technique employed in known sol-gel processes. As the starting material there can be used at least one selected from the group consisting of the compound (E), a partial hydrolysate of the compound (E), a complete hydrolysate of the compound (E), a compound formed by partial hydrolytic condensation of the compound (E), and a compound formed by condensation of a part of a complete hydrolysate of the compound (E).

The metal oxide (Aa) to be mixed with an inorganic phosphorus compound (BI)-containing material (the inorganic phosphorus compound (BI) itself or a composition containing the inorganic phosphorus compound (BI)) is preferably substantially free of phosphorus atoms.

[Compound (Ab)]

The reaction product (D) included in the compound (Ab) is obtained by a reaction between the metal oxide (Aa) and the inorganic phosphorus compound (BI). A compound formed by a reaction among the metal oxide (Aa), the inorganic phosphorus compound (BI), and another compound is also categorized as the reaction product (D). The compound (Ab) may partially include the metal oxide (Aa) and/or inorganic phosphorus compound (BI) that remains uninvolved in any reaction.

In the compound (Ab), the molar ratio between the metal atoms constituting the metal oxide (Aa) and the phosphorus atoms derived from the inorganic phosphorus compound (BI), as expressed by [Metal atoms constituting metal oxide (Aa)]:[Phosphorus atoms derived from inorganic phosphorus compound (BI)], is preferably 1.0:1.0 to 3.6:1.0 and more preferably 1.1:1.0 to 3.0:1.0. If the molar ratio falls outside such a range, the gas barrier performance deteriorates. The molar ratio in the compound (Ab) can be controlled by adjusting the mixing ratio between the metal oxide (Aa) and the inorganic phosphorus compound (BI) in a coating liquid for forming the compound (Ab). The molar ratio in the compound (Ab) is typically equal to that in the coating liquid.

In an infrared absorption spectrum of the layer (Y), a maximum absorption wavenumber in the region from 800 to 1,400 cm$^{-1}$ is preferably 1,080 to 1,130 cm$^{-1}$. In the process in which the metal oxide (Aa) and the inorganic phosphorus compound (BI) react to form the reaction product (D), a metal atom (M) derived from the metal oxide (Aa) and a phosphorus atom (P) derived from the inorganic phosphorus compound (BI) are linked via an oxygen atom (O) to form a bond represented by M-O—P. As a result, a characteristic absorption band attributed to this bond appears in an infrared absorption spectrum of the reaction product (D). A study by the present inventors has revealed that the resulting multilayer structure exhibits good gas barrier properties when the characteristic absorption band attributed to the M-O—P bond is observed in the region from 1,080 to 1,130 cm$^{-1}$. It has been found that the resulting multilayer structure exhibits much better gas barrier properties particularly when the characteristic absorption band corresponds to the strongest absorption in the region from 800 to 1,400 cm$^{-1}$ where absorptions attributed to bonds between various atoms and oxygen atoms are generally observed.

By contrast, if a metal compound such as a metal alkoxide or metal salt and the inorganic phosphorus compound (BI) are first mixed together and the mixture is then subjected to hydrolytic condensation, the resulting product is a composite material in which the metal atoms derived from the metal compound and the phosphorus atoms derived from the inorganic phosphorus compound (BI) have been almost homogeneously mixed and reacted. In this case, in an infrared absorption spectrum of the composite material, the maximum absorption wavenumber in the region from 800 to 1,400 cm$^{-1}$ falls outside the range of 1,080 to 1,130 cm$^{-1}$.

In the infrared absorption spectrum of the layer (Y), the width at half maximum of the maximum absorption band in the region from 800 to 1,400 cm$^{-1}$ is preferably 200 cm$^{-1}$ or less, more preferably 150 cm$^{-1}$ or less, even more preferably 100 cm$^{-1}$ or less, and particularly preferably 50 cm$^{-1}$ or less, in terms of the gas barrier properties of the resulting multilayer structure.

The infrared absorption spectrum of the layer (Y) can be measured by the method described in "EXAMPLES" below. If the measurement is not possible by the method described in "EXAMPLES", the measurement may be conducted by another method, examples of which include, but are not limited to: reflection spectroscopy such as reflection absorption spectroscopy, external reflection spectroscopy, or attenuated total reflection spectroscopy; and transmission spectroscopy such as Nujol method or pellet method performed on the layer (Y) scraped from the multilayer structure.

The compound (Ab) may have a structure in which particles of the metal oxide (Aa) are bonded together via phosphorus atoms derived from the inorganic phosphorus compound (BI). The particles of the metal oxide (Aa) which are used as a starting material for formation of the compound (Ab) may change in shape or size during the process of the formation of the compound (Ab).

[Inorganic Phosphorus Compound (BI)]

The inorganic phosphorus compound (BI) has a moiety capable of reacting with the metal oxide (Aa) and typically has two or more such moieties. It is preferable for the inorganic phosphorus compound (BI) to be a compound having 2 to 20 such moieties (atomic groups or functional groups). Examples of such moieties include a moiety capable of undergoing a condensation reaction with a functional group (e.g., hydroxy group) present on the surface of the metal oxide (Aa). Examples of such a moiety include a halogen atom bonded directly to a phosphorus atom and an oxygen atom bonded directly to a phosphorus atom. In general, the functional group (e.g., hydroxy group) present on the surface of the metal oxide (Aa) is bonded to the metal atom (M) constituting the metal oxide (Aa).

Examples of the inorganic phosphorus compound (BI) include: phosphorus oxoacids such as phosphoric acid, diphosphoric acid, triphosphoric acid, polyphosphoric acid formed by condensation of 4 or more molecules of phosphoric acid, phosphorous acid, phosphonic acid, phosphonous acid, phosphinic acid, and phosphinous acid; salts of these oxoacids (e.g., sodium phosphate); and derivatives of these oxoacids (e.g., halides such as phosphoryl chloride and dehydration products such as phosphorus pentoxide).

These inorganic phosphorus compounds (BI) may be used alone or in combination with one another. Among these inorganic phosphorus compound (BI), phosphoric acid is preferably used alone or in combination with another inorganic phosphorus compound (BI). The use of phosphoric acid improves the stability of the coating liquid (S) described later and the gas barrier properties of the resulting multilayer structure. When phosphoric acid is used in combination with another inorganic phosphorus compound (BI), phosphoric acid preferably makes up 50 mol % or more of the total inorganic phosphorus compounds (BI).

[Inorganic Deposited Layer, Compound (Ac), and Compound (Ad)]

The multilayer structure may further include an inorganic deposited layer. The inorganic deposited layer can be formed by vapor deposition of an inorganic substance. Examples of the inorganic substance include metals (such as aluminum), metal oxides (such as silicon oxide and aluminum oxide), metal nitrides (such as silicon nitride), metal oxynitrides (such as silicon oxynitride), and metal carbonitrides (such as silicon carbonitride). Among these, aluminum oxide, silicon oxide, magnesium oxide, and silicon nitride are preferred, since an inorganic deposited layer formed of any of these substances has good barrier properties against oxygen or water vapor. The layer (Y) in the multilayer structure of the present invention may include an inorganic deposited layer containing aluminum. For example, the layer (Y) may include a deposited layer of aluminum (Ac) and/or a deposited layer of aluminum oxide (Ad).

The method for forming the inorganic deposited layer is not particularly limited, and available methods include: physical vapor deposition processes such as vacuum vapor deposition (e.g., resistive heating vapor deposition, electron beam vapor deposition, and molecular beam epitaxy), sputtering, and ion plating; and chemical vapor deposition processes such as thermal chemical vapor deposition (e.g., catalytic chemical vapor deposition), photochemical vapor deposition, plasma chemical vapor deposition (e.g., capacitively coupled plasma process, inductively coupled plasma process, surface wave plasma process, electron cyclotron resonance plasma process, and dual magnetron process), atomic layer deposition, and organometallic vapor deposition.

The thickness of the inorganic deposited layer is preferably 0.002 to 0.5 µm, more preferably 0.005 to 0.2 µm, and even more preferably 0.01 to 0.1 µm, although the specific preferred thickness depends on the type of the component of the inorganic deposited layer. A thickness at which good barrier properties or mechanical properties of the multilayer structure are achieved can be selected within the above range. If the thickness of the inorganic deposited layer is less than 0.002 µm, the inorganic deposited layer tends to have a low ability to repeatedly exhibit the barrier properties against oxygen or water vapor, and the inorganic deposited layer may fail to exhibit sufficient barrier properties. If the thickness of the inorganic deposited layer is more than 0.5 µm, the barrier properties of the inorganic deposited layer are likely to deteriorate when the multilayer structure is pulled or bent.

[Organic Phosphorus Compound (BO)]

Examples of the phosphorus atom-containing functional group in the organic phosphorus compound (BO) include a phosphoric acid group, a phosphorous acid group, a phosphonic acid group, a phosphonous acid group, a phosphinic acid group, a phosphinous acid group, and functional groups derived from these groups (e.g., salts, (partial) esters, halides (such as chloride), and dehydration products). Among these, a phosphoric acid group and a phosphonic acid group are preferred, and a phosphonic acid group is more preferred.

It is preferable for the organic phosphorus compound (BO) to be a polymer (BOa) having the phosphorus atom-containing functional group. Examples of the polymer (BOa) include: polymers of phosphono(meth)acrylic acid ester compounds such as 6-[(2-phosphonoacetyl)oxy]hexyl acrylate, 2-phosphonooxyethyl methacrylate, phosphonomethyl methacrylate, 11-phosphonoundecyl methacrylate, and 1,1-diphosphonoethyl methacrylate; polymers of vinylphosphonic acid compounds such as vinylphosphonic acid, 2-propene-1-phosphonic acid, 4-vinylbenzylphosphonic acid, and 4-vinylphenylphosphonic acid; polymers of vinylphosphinic acid compounds such as vinylphosphinic acid and 4-vinylbenzylphosphinic acid; and phosphorylated starch. The polymer (BOa) may be a homopolymer of a monomer having at least one phosphorus atom-containing functional group or may be a copolymer of two or more monomers. Alternatively, a combination of two or more polymers each formed from a single monomer may be used as the polymer (BOa). In particular, a polymer of a phosphono(meth)acrylic acid ester compound and a polymer of a vinylphosphonic acid compound are preferred, and a polymer of a vinylphosphonic acid compound is more preferred. Poly(vinylphosphonic acid) is particularly preferred as the polymer (BOa). The polymer (BOa) can be obtained also by homopolymerization or copolymerization of a vinylphosphonic acid derivative such as a vinylphosphonic acid halide or vinylphosphonic acid ester, followed by hydrolysis.

Alternatively, the polymer (BOa) may be a copolymer of a monomer having at least one phosphorus atom-containing functional group and another vinyl monomer. Examples of the other vinyl monomer copolymerizable with the monomer having the phosphorus atom-containing functional group include (meth)acrylic acid, (meth)acrylic acid esters, (meth)acrylonitrile, styrene, nuclear-substituted styrenes, alkyl vinyl ethers, alkyl vinyl esters, perfluoroalkyl vinyl ethers, perfluoroalkyl vinyl esters, maleic acid, maleic anhydride, fumaric acid, itaconic acid, maleimide, and phenylmaleimide. Among these, (meth)acrylic acid esters, acrylonitrile, styrene, maleimide, and phenylmaleimide are preferred.

In order to obtain a multilayer structure that has better bending resistance, the proportion of the structural units derived from the monomer having the phosphorus atom-containing functional group in the total structural units of the polymer (BOa) is preferably 10 mol % or more, more preferably 20 mol % or more, even more preferably 40 mol % or more, and particularly preferably 70 mol % or more, and may be 100 mol %.

The molecular weight of the polymer (BOa) is not particularly limited, but is preferably such that the number-average molecular weight is in the range of 1,000 to 100,000. When the number-average molecular weight is in this range, both a high level of improving effect of stacking of the layer (Y) on bending resistance and a high level of viscosity stability of a coating liquid (T) described later can be achieved.

When the layer (Y) of the multilayer structure contains the inorganic phosphorus compound (BI), the ratio $W_{BO}/W_{BI}$ between the weight $W_{BI}$ of the inorganic phosphorus compound (BI) and the weight $W_{BO}$ of the organic phosphorus compound (BO) in the layer (Y) preferably satisfies a relationship of $0.01/99.99 \leq W_{BO}/W_{BI} < 1.00/99.00$. In terms of achieving a high peel strength, the ratio $W_{BO}/W_{BI}$ more preferably satisfies a relationship of $0.10/99.90 \leq W_{BO}/W_{BI} < 0.99/99.01$, even more preferably satisfies a relationship of $0.15/99.85 \leq W_{BO}/W_{BI} < 0.95/99.05$, and particularly preferably satisfies a relationship of $0.20/99.80 \leq W_{BO}/W_{BI} < 0.93/99.07$. That is, it is preferable to use the compounds in such proportions that the proportion of $W_{BO}$ be low, in particular 0.01 or more and less than 1.00, while the proportion of $W_{BI}$ be high, in particular more than 99.00 and 99.99 or less.

[Metal Ion (Z)]

The metal ion (Z) is at least one selected from ions of metals of Groups 1, 2, 3, 4, 5, 6, 7, 8, 9, 10, 11, and 12 of the periodic table.

For example, the metal ion (Z) may be at least one metal ion selected from the group consisting of a lithium ion, a potassium ion, a sodium ion, a magnesium ion, a calcium ion, a manganese ion, an iron ion, a cobalt ion, a nickel ion, a copper ion, and a zinc ion. In terms of better interlayer adhesion of the resulting multilayer structure, the metal ion (Z) is preferably at least one metal ion selected from the group consisting of ions of metals of Groups 1, 2, and 12 of the periodic table, more preferably at least one selected from the group consisting of a lithium ion, a calcium ion, a magnesium ion, and a zinc ion, and even more preferably at least one selected from the group consisting of a magnesium ion and a zinc ion.

The metal ion (Z) can be incorporated, for example, in the form of an ionic compound (Za) of the metal ion (Z) or a metal oxide (Zb) containing the metal ion (Z).

The ionic compound (Za) is a compound that is composed of the metal ion (Z) and an anion and that releases the metal ion (Z) in solution. Examples of the anion which is a constituent of the ionic compound (Za) include: inorganic acid ions such as a hydroxide ion, a carbonate ion, a chloride ion, a nitrate ion, a hydrogen carbonate ion, a sulfate ion, and a hydrogen sulfate ion; and organic acid ions such as an oxalate ion, an acetate ion, a tartrate ion, and a stearate ion. Among these, an acetate ion is preferred in terms of solubility and handleability. Specific examples of the ionic compound (Za) include lithium chloride, magnesium hydroxide, magnesium nitrate, zinc nitrate, and zinc acetate.

The metal oxide (Zb) is a compound that releases the metal ion (Z) in solution. Specific examples of the metal oxide (Zb) include magnesium oxide and zinc oxide.

The metal ion (Z) may be a component derived from a polymerization initiator used for formation of the polymer (BOa). Examples of the polymerization initiator include organic alkali metal compounds, Grignard reagents, and metal amides.

The content of the metal ion (Z) in the layer (Y) is 0.4 to 8.0 mol % relative to the content of the phosphorus atom-containing functional group of the organic phosphorus compound (BO). In terms of achieving a high peel strength even after retorting, the content of the metal ion (Z) is preferably 0.6 to 7.0 mol % and more preferably 0.8 to 6.8 mol % relative to the content of the phosphorus atom-containing functional group. It is thought that the metal ion (Z) and the phosphorus atom-containing functional group of the organic phosphorus compound (BO) react with each other to cause ion crosslinking between molecules of the organic phosphorus compound (BO), resulting in a high peel strength. This is a possible mechanism of peel strength improvement, but the technical scope of the present invention encompasses situations to which the mechanism presented above does not apply, as long as the requirements specified in the present invention are met.

The layer (Y) included in the multilayer structure of the present invention may consist only of the aluminum-containing compound (A), the organic phosphorus compound (BO), and the metal ion (Z), may consist only of the aluminum-containing compound (A), the inorganic phosphorus compound (BI), the organic phosphorus compound (BO), and the metal ion (Z), may consist only of the aluminum-containing metal oxide (Aa), the inorganic phosphorus compound (BI), the organic phosphorus compound (BO), and the metal ion (Z), may consist only of the inorganic phosphorus compound (BI), the organic phosphorus compound (BO), the metal ion (Z), and the compound (Ab) including the reaction product (D) of the aluminum-containing metal oxide (Aa) and the inorganic phosphorus compound (BI), or may consist only of the aluminum-containing metal oxide (Aa), the inorganic phosphorus compound (BI), the organic phosphorus compound (BO), the metal ion (Z), and the compound (Ab) including the reaction product (D) of the aluminum-containing metal oxide (Aa) and the inorganic phosphorus compound (BI). In all of the above aspects, the layer (Y) can further contain an additional component. Examples of the additional component include metal salts of inorganic acids such as a metal carbonate, a metal hydrochloride, a metal nitrate, a metal hydrogen carbonate, a metal sulfate, a metal hydrogen sulfate, and a metal borate that do not contain the metal ion (Z); metal salts of organic acids such as a metal oxalate, a metal acetate, a metal tartrate, and a metal stearate that do not contain the metal ion (Z); layered clay compounds; crosslinkers; a polymer compound (F) other than the organic phosphorus compound (BO); plasticizers; antioxidants; ultraviolet absorbers; and flame retardants. The content of the additional component in the layer (Y) of the multilayer structure is preferably 50 wt % or less, more preferably 20 wt % or less, even more preferably 10 wt % or less, and particularly preferably 5 wt % or less, and may be 0 wt % (which means that the additional component is not contained).

[Polymer Compound (F)]

The polymer compound (F) may be, for example, a polymer (Fa) having at least one functional group selected from the group consisting of an ether bond, a carbonyl group, a hydroxy group, a carboxyl group, a carboxylic anhydride group, and a salt of a carboxyl group.

Examples of the polymer (Fa) include: polyethylene glycol; polyketone; polyvinyl alcohol polymers such as polyvinyl alcohol, modified polyvinyl alcohol containing 1 to 50 mol % of α-olefin units having 4 or less carbon atoms, and polyvinyl acetal (e.g., polyvinyl butyral); polysaccharides such as cellulose, starch, and cyclodextrin; (meth)acrylic polymers such as polyhydroxyethyl (meth)acrylate, poly(meth)acrylic acid, and ethylene-acrylic acid copolymer; and maleic polymers such as a hydrolysate of ethylene-maleic anhydride copolymer, a hydrolysate of styrene-maleic anhydride copolymer, and a hydrolysate of isobutylene-maleic anhydride alternating copolymer. Among these, polyvinyl alcohol polymers are preferred. Specifically, polyvinyl alcohol and modified polyvinyl alcohol containing 1 to 15 mol % of α-olefin units having 4 or less carbon atoms are preferred.

The polymer (Fa) may be a homopolymer of a monomer having a polymerizable group (e.g., vinyl acetate or acrylic acid), may be a copolymer of two or more monomers, or may be a copolymer of a monomer having a hydroxy group and/or carboxyl group and a monomer having none of these groups. A combination of two or more polymers (Fa) may be used as the polymer (Fa).

The molecular weight of the polymer (Fa) is not particularly limited. In order to obtain a multilayer structure that has better gas barrier properties and higher mechanical strength, the number-average molecular weight of the polymer (Fa) is preferably 5,000 or more, more preferably 8,000 or more, and even more preferably 10,000 or more. The upper limit of the number-average molecular weight of the polymer (Fa) is not particularly defined, and the number-average molecular weight is, for example, 1,500,000 or less.

In terms of allowing the multilayer structure to have good appearance, the content of the polymer (Fa) in the layer (Y) is preferably 85 wt % or less, more preferably 50 wt % or less, even more preferably 20 wt % or less, and particularly preferably 10 wt % or less, with respect to the weight of the layer (Y) (defined as 100 wt %). The polymer (Fa) may or may not react with another component in the layer (Y).

The thickness of the layer (Y) (or, for a multilayer structure including two or more layers (Y), the total thickness of the layers (Y)), is preferably 0.05 to 4.0 μm and more preferably 0.1 to 2.0 μm. Thinning the layer (Y) provides a reduction in the dimensional change of the multilayer structure during a process such as printing or lamination. Thinning the layer (Y) also provides an increase in the flexibility of the multilayer structure, thus making it possible to allow the multilayer structure to have mechanical characteristics close to mechanical characteristics intrinsic to the base. When the multilayer structure of the present invention includes two or more layers (Y), the thickness of each layer (Y) is preferably 0.05 µm or more in terms of gas barrier properties. The thickness of the layer (Y) can be controlled depending on the concentration of the later-described coating liquid (S) used for formation of the layer (Y) or the method for applying the liquid (S).

The thickness of the layer (Y) can be measured by observing a cross-section of the multilayer structure with a scanning electron microscope or transmission electron microscope.

[Method for Producing Multilayer Structure]

The features described for the multilayer structure of the present invention can be applied to the production method of the present invention and may not be described repeatedly. The features described for the production method of the present invention can be applied to the multilayer structure of the present invention.

An example of the method for producing a multilayer structure according to the present invention is a production method including the steps of (i) forming a precursor layer, (ii) applying a coating liquid (T) containing an organic phosphorus compound (BO) containing a metal ion (Z), and (iii) forming a gas barrier layer (Y). The compound (A), the inorganic phosphorus compound (BI), the organic phosphorus compound (BO), and the weight ratio between them are as previously described, and repeated explanation will be omitted in the following description of the production method.

[Step (i)]

In the step (i), a coating liquid (S) containing the aluminum-containing compound (A) is applied onto the base (X) to form a precursor layer of the layer (Y) on the base (X). The step (i) yields a structure including the base (X) and the precursor layer of the layer (Y). When the layer (Y) is to include a deposited layer of aluminum (Ac) or a deposited layer of aluminum oxide (Ad), the deposited layer can be formed by any of the common vapor deposition processes mentioned above. The following will describe in detail how to form a precursor layer of a layer (Y1) containing the compound (Ab).

In a preferred embodiment, the coating liquid (S) (first coating liquid) can be prepared, for example, by mixing the metal oxide (Aa) and the inorganic phosphorus compound (BI) in a solvent to cause a reaction. Specifically, the coating liquid (S) can be prepared, for example, by a method in which a dispersion of the metal oxide (Aa) and a solution containing the inorganic phosphorus compound (BI) are mixed or by a method in which the inorganic phosphorus compound (BI) is added to and mixed with a dispersion of the metal oxide (Aa). The temperature during the mixing is preferably 50° C. or lower, more preferably 30° C. or lower, and even more preferably 20° C. or lower. The coating liquid (S) may contain another compound (e.g., the polymer compound (F)), and may contain, if desired, at least one acid compound (Q) selected from the group consisting of acetic acid, hydrochloric acid, nitric acid, trifluoroacetic acid, and trichloroacetic acid.

The dispersion of the metal oxide (Aa) can be prepared, for example, by mixing the compound (E), water, and optionally an acid catalyst or organic solvent and allowing the compound (E) to undergo condensation or hydrolytic condensation according to procedures employed in known sol-gel processes. When the dispersion of the metal oxide (Aa) is obtained by condensation or hydrolytic condensation of the compound (E), the dispersion obtained may, if desired, be subjected to a certain process (such as deflocculation in the presence of the acid compound (Q)). The solvent used is preferably, but not limited to, an alcohol such as methanol, ethanol, or isopropanol, water, or a mixed solvent thereof.

The solution containing the inorganic phosphorus compound (BI) can be prepared by dissolving the inorganic phosphorus compound (BI) in a solvent. The solvent can be selected depending on the type of the inorganic phosphorus compound (BI), and preferably contains water. The solvent may contain an organic solvent (e.g., an alcohol such as methanol) as long as the organic solvent does not hinder the dissolution of the inorganic phosphorus compound (BI).

The solids concentration in the coating liquid (S) is preferably 1 to 20 wt %, more preferably 2 to 15 wt %, and even more preferably 3 to 10 wt %, in terms of the storage stability of the coating liquid and the quality of application of the coating liquid onto the base (X). The solids concentration can be determined, for example, by distilling off the solvent from the coating liquid (S) and dividing the weight of the remaining solids by the initial weight of the coating liquid (S) yet to be subjected to the distillation.

The viscosity of the coating liquid (S) is preferably 3,000 mPa·s or less, more preferably 2,500 mPa·s or less, and even more preferably 2,000 mPa·s or less, as measured with a Brookfield rotational viscometer (SB-type viscometer: rotor No. 3, rotational speed=60 rpm) at a temperature at which the coating liquid (S) is applied. Adjusting the viscosity to 3,000 mPa·s or less improves the leveling of the coating liquid (S), thus allowing the resulting multilayer structure to have better appearance. The viscosity of the coating liquid (S) is preferably 50 mPa·s or more, more preferably 100 mPa·s or more, and even more preferably 200 mPa·s or more.

The molar ratio between aluminum atoms and phosphorus atoms in the coating liquid (S), as expressed by aluminum atoms:phosphorus atoms, is preferably, but not limited to, 1.01:1.00 to 1.50:1.00, and more preferably 1.05:1.00 to 1.45:1.00. The molar ratio between aluminum atoms and phosphorus atoms can be determined by fluorescent X-ray analysis of a solid obtained by drying the coating liquid (S).

The coating liquid (S) may be applied directly onto at least one surface of the base (X) or applied onto the base (X) with an additional layer (J) interposed therebetween. An adhesive layer (I) may be formed on a surface of the base (X) by treating the surface of the base (X) with a known anchor coating agent or applying a known adhesive onto the surface of the base (X) before application of the coating liquid (S).

The method for application of the coating liquid (S) is not particularly limited, and any known method can be employed. Examples of the method for application include casting, dipping, roll coating, gravure coating, screen printing, reverse coating, spray coating, kiss coating, die coating, metering bar coating, chamber doctor-using coating, curtain coating, and bar coating.

In the step (i), the precursor layer of the layer (Y1) is formed typically by removing the solvent from the coating liquid (S). The method for removing the solvent is not particularly limited, and any known drying method can be employed. Examples of the drying method include hot air drying, hot roll contact drying, infrared heating, and microwave heating. The drying temperature is preferably equal to or lower than the onset temperature of fluidization of the base (X). The temperature employed for drying the applied coating liquid (S) may be, for example, around 80 to 180° C. or around 90 to 150° C. The drying time is preferably, but not limited to, 0.1 seconds to 1 hour, more preferably 1 second to 15 minutes, and even more preferably 5 to 300 seconds, for example. The drying is preferably followed by a heat treatment. The heat treatment temperature may be, for example, around 100 to 200° C. or around 120 to 180° C., and is preferably higher than the drying temperature. The heat treatment time is preferably, but not limited to, 1 second to 1 hour, more preferably 1 second to 15 minutes, and even more preferably 5 to 300 seconds, for example. Such a heat treatment prior to application of the coating liquid (T) containing the organic phosphorus compound (BO) is preferred to obtain a multilayer structure having good properties.

[Step (ii)]

In the step (ii), the coating liquid (T) (second coating liquid) containing the organic phosphorus compound (BO) containing the metal ion (Z) is applied onto that precursor layer of the layer (Y) which has been obtained in the step (i). The coating liquid (T) can be prepared by mixing the metal ion (Z)-containing organic phosphorus compound (BO) and a solvent. The solvent used in the coating liquid (T) can be selected as appropriate depending on the type of the organic phosphorus compound (BO), and is preferably, but not limited to, an alcohol such as methanol, ethanol, or isopropanol, water, or a mixed solvent thereof.

The solids concentration in the coating liquid (T) is preferably 0.01 to 60 wt %, more preferably 0.1 to 50 wt %, and even more preferably 0.2 to 40 wt % in terms of the storage stability of the liquid or the quality of application of the liquid. The solids concentration can be determined by the same method as described for the coating liquid (S). The coating liquid (T) may contain another component (e.g., the polymer compound (F)) that may be contained in the layer (Y) described above, as long as the effect of the present invention is obtained.

The application of the coating liquid (T) is followed by removal of the solvent, resulting in the formation of the precursor layer of the layer (Y). As is the case for application of the coating liquid (S), the method for applying the coating liquid (T) is not particularly limited, and any known method can be employed. When the inorganic phosphorus compound (BI) is further used, it is particularly preferable, in terms of good barrier performance, to adjust the amount of the coating liquid (T) to be applied so that the ratio $W_{BO}/W_{BI}$ between the weight $W_{BI}$ of the inorganic phosphorus compound (BI) and the weight $W_{BO}$ of the organic phosphorus compound (BO) satisfies the predetermined relationship described above.

The method for removing the solvent from the coating liquid (T) is not particularly limited, and any known drying method can be employed. Examples of the drying method include hot air drying, hot roll contact drying, infrared heating, and microwave heating. The drying temperature is preferably equal to or lower than the onset temperature of fluidization of the base (X). The temperature employed for drying the applied coating liquid (T) may be, for example, around 90 to 240° C., and is preferably 100 to 200° C.

[Step (iii)]

In the step (iii), the precursor layer of the layer (Y1), which has been formed through the steps (i) and (ii), is heat-treated at a temperature of 140° C. or higher to form the layer (Y1). The heat treatment temperature is preferably higher than the temperature employed for drying the applied coating liquid (T).

In the step (iii), a reaction takes place in which particles of the metal oxide (Aa) are bonded together via phosphorus atoms (phosphorus atoms derived from the inorganic phosphorus compound (BI)). From another standpoint, a reaction of formation of the reaction product (D) takes place in the step (iii). To allow the reaction to take place to a sufficient extent, the heat treatment temperature is 140° C. or higher, preferably 170° C. or higher, more preferably 180° C. or higher, and even more preferably 190° C. or higher. A lowered heat treatment temperature increases the time required to achieve a sufficient reaction rate, thereby causing a reduction in production efficiency. The preferred upper limit of the heat treatment temperature depends on, for example, the type of the base (X). For example, when a thermoplastic resin film made of polyamide resin is used as the base (X), the heat treatment temperature is preferably 270° C. or lower. When a thermoplastic resin film made of polyester resin is used as the base (X), the heat treatment temperature is preferably 240° C. or lower. The heat treatment may be carried out, for example, in an air atmosphere, nitrogen atmosphere, or argon atmosphere. The heat treatment time is preferably 0.1 seconds to 1 hour, more preferably 1 second to 15 minutes, and even more preferably 5 to 300 seconds.

In a preferred embodiment of the method for producing a multilayer structure according to the present invention, the application of the coating liquid (S) is followed by drying (first drying) and then by heat treatment (first heat treatment) to form a precursor layer, and the application of the coating liquid (T) is followed by drying (second drying) and then by heat treatment (second heat treatment). It is preferable that the temperature of the first heat treatment be higher than the temperature of the first drying, the temperature of the second heat treatment be higher than the temperature of the second drying, and the temperature of the second heat treatment be higher than the temperature of the first heat treatment.

In the multilayer structure of the present invention, the layer (Y) may be stacked in direct contact with the base (X). Alternatively, the layer (Y) may be stacked over the base (X), with another layer (e.g., the adhesive layer (I) or additional layer (J)) interposed therebetween.

[Adhesive Layer (I)]

In the multilayer structure of the present invention, the adhesion between the base (X) and the layer (Y) can be enhanced by means of the adhesive layer (I). The adhesive layer (I) may be made of an adhesive resin. The adhesive layer (I) made of an adhesive resin can be formed by treating a surface of the base (X) with a known anchor coating agent or applying a known adhesive onto the surface of the base (X). The adhesive is preferably a two-component reactive polyurethane adhesive including a polyisocyanate component and a polyol component which are to be mixed and reacted. Addition of a small amount of an additive such as a known silane coupling agent to the anchor coating agent or adhesive may further enhance the adhesion. Examples of the silane coupling agent include, but are not limited to, silane coupling agents having a reactive group such as an isocyanate, epoxy, amino, ureido, or mercapto group. Strong adhesion between the base (X) and layer (Y) via the adhesive layer (I) makes it possible to effectively prevent deterioration in the gas barrier properties or appearance of the multilayer structure of the present invention when the multilayer structure is subjected to a process such as printing or lamination, and also makes it possible to increase the drop impact resistance of a packaging material including the multilayer structure of the present invention. The thickness of the adhesive layer (I) is preferably 0.01 to 10.0 μm and more preferably 0.03 to 5.0 μm.

[Additional Layer (J)]

The multilayer structure of the present invention may further include the additional layer (J) for improving various properties (such as heat sealing properties, barrier properties, and mechanical properties). The multilayer structure of the present invention that includes the additional layer (J) can be produced, for example, by stacking the layer (Y) on the base (X) directly or with the adhesive layer (I) interposed therebetween and then by attaching or forming the additional layer (J) on the layer (Y) directly or with the adhesive layer (I) interposed therebetween. Examples of the additional layer (J) include, but are not limited to: ink layers; and thermoplastic resin layers such as a polyolefin layer and an ethylene-vinyl alcohol copolymer resin layer.

The multilayer structure of the present invention may include an ink layer on which a product name, decorative pattern, or the like is to be printed. The multilayer structure of the present invention that includes an ink layer can be produced, for example, by staking the layer (Y) on the base (X) directly or with the adhesive layer (I) interposed therebetween and then by forming the ink layer directly on the layer (Y). Examples of the ink layer include a film resulting from drying of a liquid prepared by dispersing a polyurethane resin containing a pigment (e.g., titanium dioxide) in a solvent. The ink layer may be a film resulting from drying of an ink or electronic circuit-forming resist containing a polyurethane resin free of any pigment or another resin as a main component. Methods that can be used to apply the ink layer onto the layer (Y) include gravure printing and various coating methods using a wire bar, a spin coater, or a die coater. The thickness of the ink layer is preferably 0.5 to 10.0 μm and more preferably 1.0 to 4.0 μm.

The polymer (Fa) has at least one functional group selected from the group consisting of an ether bond, a carbonyl group, a hydroxy group, and a carboxyl group which have high affinity to the adhesive layer (I) or additional layer (J) (e.g., the ink layer); therefore, when the layer (Y) of the multilayer structure of the present invention contains the polymer (Fa), the adhesion of the layer (Y) to another layer is enhanced. This can enable the multilayer structure to maintain interlayer adhesion after retorting and thus prevent the multilayer structure from suffering from an appearance defect such as delamination.

Placing a polyolefin layer as an outermost layer of the multilayer structure of the present invention can impart heat-sealing properties to the multilayer structure or improve the mechanical characteristics of the multilayer structure. In terms of, for example, the impartation of heat-sealing properties and the improvement in mechanical characteristics, the polyolefin is preferably polypropylene or polyethylene. It is also preferable to stack at least one film selected from the group consisting of a film made of a polyester, a film made of a polyamide, and a film made of a hydroxy group-containing polymer, in order to improve the mechanical characteristics of the multilayer structure. In terms of the improvement in mechanical characteristics, the polyester is preferably polyethylene terephthalate, and the polyamide is preferably nylon-6. In terms of allowing all the layers to have barrier properties, the hydroxy group-containing polymer is preferably ethylene-vinyl alcohol copolymer. Between the layers there may, if desired, be provided an anchor coat layer or a layer made of an adhesive.

[Configuration of Multilayer Structure]

Specific examples of the configuration of the multilayer structure of the present invention are listed below. The multilayer structure may include a member (e.g., the adhesive layer (I) or additional layer (J)) other than the base (X) and layer (Y); however, the other member is omitted in the following list of specific examples. The multilayer structures listed below as specific examples may be stacked on top of each other or combined with each other.

(1) Layer (Y)/polyester layer,
(2) Layer (Y)/polyester layer/layer (Y),
(3) Layer (Y)/polyamide layer,
(4) Layer (Y)/polyamide layer/layer (Y),
(5) Layer (Y)/polyolefin layer,
(6) Layer (Y)/polyolefin layer/layer (Y),
(7) Layer (Y)/hydroxy group-containing polymer layer,
(8) Layer (Y)/hydroxy group-containing polymer layer/layer (Y),
(9) Layer (Y)/inorganic deposited layer/polyester layer,
(10) Layer (Y)/inorganic deposited layer/polyamide layer,
(11) Layer (Y)/inorganic deposited layer/polyolefin layer,
(12) Layer (Y)/inorganic deposited layer/hydroxy group-containing polymer layer The multilayer structure of the present invention has an oxygen transmission rate of 2.0 mL/($m^2 \cdot day \cdot atm$) or less, preferably 0.5 mL/($m^2 \cdot day \cdot atm$) or less, more preferably 0.3 mL/($m^2 \cdot day \cdot atm$) or less, at 20° C. and 85% RH before and after retorting. The conditions of the retorting, and the method and conditions of measurement of the oxygen transmission rate, are as described in "EXAMPLES" below.

The multilayer structure of the present invention preferably has a moisture permeability of 0.5 g/($m^2 \cdot day$) or less, more preferably 0.3 g/($m^2 \cdot day$) or less, at 40° C. and 90% RH before and after retorting. The conditions of the retorting, and the method and conditions of measurement of the moisture permeability, are as described in "EXAMPLES" below.

The multilayer structure of the present invention is preferably such that a peel strength between the layer (Y) and the adhesive layer (I) or additional layer (J) (e.g., the ink layer) is more than 100 g/15 mm and more preferably 110 g/15 mm or more after retorting. The conditions of the retorting, and the method and conditions of measurement of the peal strength, are as described in "EXAMPLES" below.

[Applications]

The multilayer structure of the present invention and a packaging material including the multilayer structure have good gas barrier properties and good water vapor barrier properties and, in addition, they have high retort resistance, have good interlayer adhesion (peel strength), and suffer from no appearance defect such as delamination. Thus, the multilayer structure of the present invention and the packaging material including the multilayer structure can be used in various applications.

[Packaging Material]

The packaging material of the present invention includes a multilayer structure including a base (X) and a layer (Y) stacked on the base (X). The packaging material may consist only of the multilayer structure. That is, in the following description, the term "packaging material" may be interchanged with the term "multilayer structure". In addition, the term "packaging material" is typically interchangeable with the term "package". The packaging material may be composed of the multilayer structure and another member.

The packaging material according to a preferred embodiment of the present invention has barrier properties against inorganic gases (such as hydrogen, helium, nitrogen, oxygen, and carbon dioxide), natural gases, water vapor, and organic compounds that are liquid at ordinary temperature and pressure (such as ethanol and gasoline vapor).

When the packaging material of the present invention is in the form of a packaging bag, the multilayer structure may be used over the entirety of the packaging bag or the multilayer structure may be used in a part of the packaging bag. For example, the multilayer structure may constitute 50% to 100% of the overall area of the packaging bag. The same applies to the case where the packaging material is in a form other than a packaging bag (a container or lid, for example).

The packaging material of the present invention can be fabricated by various methods. For example, a container (packaging material) may be fabricated by subjecting a sheet of the multilayer structure or a film material including the multilayer structure (such a material will hereinafter be simply referred to as "film material") to a joining process and thereby forming the sheet of the multilayer structure or the film material into a predetermined container shape. Examples of the method for shaping include thermoforming, injection molding, and extrusion blow molding. Alternatively, a container (packaging material) may be fabricated by forming the layer (Y) on the base (X) that has been formed in a predetermined container shape beforehand. A container thus fabricated may be referred to as a "packaging container" herein.

The packaging material of the present invention is preferably used as a food packaging material. The packaging material of the present invention can be preferably used not only as a food packaging material but also as a packaging material for packaging any of the following: chemicals such as agrochemicals and pharmaceuticals; medical devices; industrial materials such as machinery components and delicate materials; and garments.

The packaging material including the multilayer structure of the present invention can be used after being formed into any of various shaped products by secondary processing. Such a shaped product may be a vertical form-fill-seal bag, a vacuum packaging bag, a pouch, a laminated tube container, an infusion bag, a paper container, a strip tape, a container lid, an in-mold labeled container, a vacuum insulator, or an electronic device. These shaped products may be formed through heat sealing.

[Vertical Form-Fill-Seal Bag]

The packaging material including the multilayer structure of the present invention may be a vertical form-fill-seal bag. An example is shown in FIG. 1. A vertical form-fill-seal bag 10 of FIG. 1 is formed of a multilayer structure 11 of the present invention that is sealed at three portions, i.e., two edge portions 11a and a body portion 11b. The vertical form-fill-seal bag 10 can be produced by a vertical form-fill-seal machine. Various methods can be employed for bag making by a vertical form-fill-seal machine. In any method, the substance to be contained in the bag is fed through the top opening of the bag into its interior, and the opening is then sealed to produce the vertical form-fill-seal bag. The vertical form-fill-seal bag is composed of, for example, one film material heat-sealed at three portions, its upper edge, lower edge, and side. The vertical form-fill-seal bag as the packaging container according to the present invention has good gas barrier properties and good water vapor barrier properties and maintains its barrier performance even after retorting. The vertical form-fill-seal bag is therefore capable of preventing quality degradation of the contained substance over a long period of time.

[Pouch]

Figure 2:
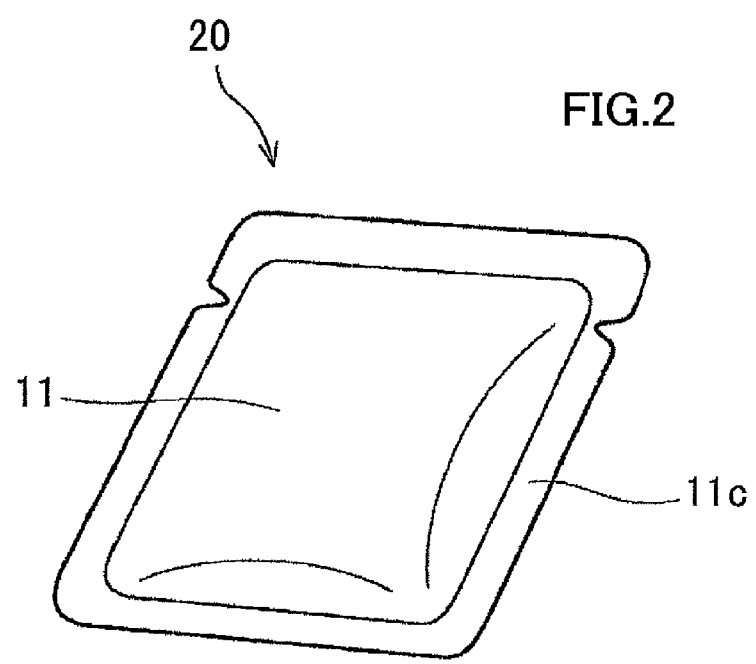
FIG. 2 is a schematic diagram of a flat pouch according to an embodiment of the present invention.

The packaging material including the multilayer structure of the present invention may be a pouch. An example is shown in FIG. 2. A flat pouch 20 of FIG. 2 is formed of two multilayer structures 11 joined together at their edges 11c. The term "pouch" as used herein generally refers to a container including a film material as a barrier member and mainly intended to contain a food, a daily commodity, or a medical product. Pouches can have various shapes and applications, and examples include a spouted pouch, a zippered pouch, a flat pouch, a stand-up pouch, a horizontal form-fill-seal pouch, and a retort pouch. Such a pouch may be formed by stacking a multilayer structure and at least one additional layer (J) together. The pouch as the packaging container according to the present invention has good gas barrier properties and good water vapor barrier properties and maintains its barrier performance even after retorting. The use of the pouch can therefore prevent the contained substance from changing in quality after transportation or long-term storage. In an example, the pouch can hold good transparency, which allows easy identification of the contained substance and easy check for change in the quality of the contained substance caused by degradation.

[Vacuum Insulator]

The packaging material including the multilayer structure of the present invention may be a vacuum insulator. An example of the vacuum insulator of the present invention is shown in FIG. 3. A vacuum insulator 30 of FIG. 3 includes two multilayer structures 11 of the present invention and a core material 31 in the form of particles. The two multilayer structures 11 are joined together at their edges 11c. The internal space defined by the two multilayer structures 11 is filled with the core material 31 and has a reduced pressure. The multilayer structures 11 are in close contact with the core material 31 due to the pressure difference between the inside and outside of the vacuum insulator 30. A vacuum insulator is a heat insulator including a sheath material and a core material disposed in an interior bounded by the sheath material, and the interior in which the core material is disposed has a reduced pressure. A vacuum insulator thinner and lighter than an insulator made of urethane foam can provide heat insulating properties comparable to the heat insulating properties provided by the urethane foam insulator. The vacuum insulator of the present invention can be used, for example, as or in: a heat insulating material for home electric appliances such as refrigerators, hot-water supply systems, and rice cookers; a residential heat insulating material used in walls, ceilings, attics, floors, etc.; a vehicle roof member; an insulating panel for automatic vending machines etc.; and a heat transfer apparatus such as a heat storage apparatus or an apparatus employing a heat pump. When used as the sheath material, the multilayer structure of the present invention preferably includes an ethylene-vinyl alcohol copolymer resin layer and an inorganic deposited layer and may have, for example, a configuration of "polyester layer/layer (Y)/polyester layer/layer (Y)/inorganic deposited layer/ethylene-vinyl alcohol copolymer layer/polyolefin layer".

The component and form of the core material are not particularly limited as long as they are adapted for heat insulation. Examples of the core material include a perlite powder, a silica powder, a precipitated silica powder, diatomite, calcium silicate, glass wool, rockwool, artificial (synthetic) wool, and foamed resins (such as styrene foam and urethane foam). A hollow container or honeycomb structure formed in a predetermined shape can also be used as the core material.

[Electronic Device]

The packaging material including the multilayer structure of the present invention can be used also in an electronic device. A partial cross-sectional view of an example of the electronic device according to the present invention is shown in FIG. 4. An electronic device 40 of FIG. 4 includes an electronic device body 41, a sealing material 42 for sealing the electronic device body 41, and a protective sheet (multilayer structure) 43 for protecting the surface of the electronic device body 41. The sealing material 42 covers the entire surface of the electronic device body 41. The protective sheet 43 is disposed over one side of the electronic device body 41, with the sealing material 42 interposed therebetween. On the side opposite to that on which the protective sheet 43 is disposed there may be disposed another protective sheet. In this case, the protective sheet disposed on the opposite side may be the same as or different from the protective sheet 43. The protective sheet 43 may be disposed on the electronic device body 41, with another member such as the sealing material 42 interposed therebetween, or may be disposed directly on the surface of the electronic device body 41.

Examples of the electronic device body 41 include, but are not limited to: photoelectric conversion devices such as solar cells; information display devices such as organic EL displays, liquid crystal displays, and electronic paper; and lighting devices such as organic EL elements. The sealing material 42 is an optional member that can be added as appropriate depending on, for example, the type and use of the electronic device body 41. Examples of the sealing material 42 include ethylene-vinyl acetate copolymer and polyvinyl butyral.

A preferred example of the electronic device body 41 is a solar cell. Examples of the solar cell include a silicon solar cell, a compound semiconductor solar cell, and an organic thin-film solar cell. Examples of the silicon solar cell include a monocrystalline silicon solar cell, a polycrystalline silicon solar cell, and an amorphous silicon solar cell. Examples of the compound semiconductor solar cell include a III-V compound semiconductor solar cell, a II-VI compound semiconductor solar cell, and a I-III-VI compound semiconductor solar cell. The solar cell may or may not be an integrated solar cell including a plurality of unit cells connected in series.

The multilayer structure of the present invention and the packaging material including the multilayer structure are suitable for use as or in the following: a display member such as a substrate film for LCDs, a substrate film for organic ELs, a substrate film for electronic paper, a sealing film for electronic devices, or a film for PDPs; a film for IC tags; a solar cell module; and a solar cell member such as a back sheet for solar cells and a protective film for solar cells. When used as a member of a display, the multilayer structure functions, for example, as a low-reflection film. In any case where the multilayer structure is required to be light-transmissive, the layer (Y) that has light transmissivity is used.

Depending on its type, the electronic device body 41 can be fabricated by a so-called roll-to-roll process. In the roll-to-roll process, a flexible substrate (e.g., a stainless steel substrate or a resin substrate) wound around a feed roll is delivered from the feed roll, then an element is formed on this substrate to fabricate the electronic device body 41, and finally the electronic device body 41 is wound on a take-up roll. In this case, it is advantageous that the protective sheet 43 be prepared beforehand in the form of a flexible long sheet, more particularly in the form of a wound roll of the long sheet. In an example, the protective sheet 43 delivered from a feed roll is stacked onto the electronic device body 41 that has yet to be wound on the take-up roll and is wound up together with the electronic device body 41. In another example, the electronic device body 41 that has been wound on the take-up roll once may be fed from the roll again and stacked onto the protective sheet 43. In a preferred example of the present invention, the electronic device per se has flexibility.

The protective sheet 43 includes the multilayer structure of the present invention. The protective sheet 43 may consist only of the multilayer structure. Alternatively, the protective sheet 43 may include the multilayer structure and another member (e.g., the additional layer (J)) stacked on the multilayer structure. The thickness and material of the protective sheet 43 are not particularly limited, as long as the sheet is a sheet of layered product suitable for protection of a surface of an electronic device and includes the multilayer structure described above.

The protective sheet may include, for example, a surface protection layer disposed on one or both of the surfaces of the multilayer structure. It is preferable for the surface protection layer to be a layer made of a scratch-resistant resin. A surface protection layer for a device such as a solar cell which may be used outdoors is preferably made of a resin having high weather resistance (e.g., light resistance). For protecting a surface required to permit transmission of light, a surface protection layer having high light transmissivity is preferred. Examples of the material of the surface protection layer (surface protection film) include poly(meth) acrylic acid ester, polycarbonate, polyethylene terephthalate, polyethylene-2,6-naphthalate, polyvinyl fluoride (PVF), polyvinylidene fluoride (PVDF), polytetrafluoroethylene (PTFE), polychlorotrifluoroethylene (PCTFE), ethylene-tetrafluoroethylene copolymer (ETFE), ethylene-chlorotrifluoroethylene copolymer (ECTFE), tetrafluoroethylene-perfluoroalkyl vinyl ether copolymer (PFA), and tetrafluoroethylene-hexafluoropropylene copolymer (FEP). In an example, the protective sheet includes a poly(meth) acrylic acid ester layer disposed on one of its sides.

An additive (e.g., an ultraviolet absorber) may be added to the surface protection layer to increase the durability of the surface protection layer. A preferred example of the surface protection layer having high weather resistance is an acrylic resin layer to which an ultraviolet absorber has been added. Examples of the ultraviolet absorber include, but are not limited to, ultraviolet absorbers based on benzotriazole, benzophenone, salicylate, cyanoacrylate, nickel, or triazine. In addition, another additive such as a stabilizer, light stabilizer, or antioxidant may be used in combination.

EXAMPLES

Hereinafter, the present invention will be described in more detail by way of examples. The present invention is not limited by these examples in any respect, and many modifications are possible by any ordinarily skilled person in the art within the technical concept of the present invention. Analysis and evaluation in Examples and Comparative Examples given below were performed as will now be described.

(1) Measurement of Infrared Absorption Spectrum

The measurement was performed by attenuated total reflection spectroscopy using a Fourier transform infrared spectrophotometer. The measurement conditions were as follows.

Apparatus: Spectrum One, manufactured by PerkinElmer, Inc.

Measurement mode: Attenuated total reflection spectroscopy

Measurement range: 800 to 1,400 $cm^{-1}$ (2) Measurement of Respective Thicknesses of Layers Each multilayer structure was cut using a focused ion beam (FIB) to prepare a section for cross-sectional observation. The prepared section was secured to a sample stage with a carbon tape and subjected to platinum ion sputtering at an accelerating voltage of 30 kV for 30 seconds. The cross-section of the multilayer structure was observed using a field-emission transmission electron microscope to determine the respective thicknesses of the layers. The measurement conditions were as follows.

Apparatus: JEM-2100F, manufactured by JEOL Ltd.
Accelerating voltage: 200 kV
Magnification: ×250,000

(3) Measurement of Oxygen Transmission Rate

A sample was set to an oxygen transmission rate measurement apparatus in such a manner that the layer as the base faced the carrier gas side, and the oxygen transmission rate was measured by an equal pressure method. The measurement conditions were as follows.

Apparatus: MOCON OX-TRAN 2/20, manufactured by ModernControls, Inc.
Temperature: 20° C.
Humidity on oxygen feed side: 85% RH
Humidity on carrier gas side: 85% RH
Oxygen pressure: 1.0 atm
Carrier gas pressure: 1.0 atm (4) Measurement of Moisture Permeability A sample was set to a water vapor transmission rate measurement apparatus in such a manner that the layer as the base faced the carrier gas side, and the moisture permeability (water vapor transmission rate) was measured by an equal pressure method. The measurement conditions were as follows.

Apparatus: MOCON PERMATRAN W3/33, manufactured by ModernControls, Inc.
Temperature: 40° C.
Humidity on water vapor feed side: 90% RH Humidity on carrier gas side: 0% RH (5) Evaluation of Adhesion Adhesion was evaluated by measurement of a T-peel strength (adhesive strength per 15 mm width). The measurement was performed five times, and an average of the measured values was employed as an index. The measurement conditions were as follows.

Apparatus: Autograph AGS-H, manufactured by Shimadzu Corporation
Peel rate: 250 mm/min
Temperature: 23° C.
Humidity: 50% RH <Production Example of Coating Liquid (S-1)>

Distilled water in an amount of 230 parts by weight was heated to 70° C. under stirring. Triisopropoxyaluminum in an amount of 88 parts by weight was added dropwise to the distilled water over 1 hour, the liquid temperature was gradually increased to 95° C., and isopropanol generated was distilled off. In this manner, hydrolytic condensation was performed. To the resulting liquid was added 4.0 parts by weight of a 60 wt % aqueous nitric acid solution, and this was followed by stirring at 95° C. for 3 hours to deflocculate agglomerates of particles of the hydrolytic condensate. After that, the liquid was concentrated so that the concentration of solids calculated as aluminum oxide was adjusted to 10 wt %. To 22.50 parts by weight of the solution thus obtained were added 54.29 parts by weight of distilled water and 18.80 parts by weight of methanol. This was followed by stirring to obtain a homogeneous dispersion. Subsequently, 4.41 parts by weight of an 85 wt % aqueous phosphoric acid solution was added dropwise to the dispersion under stirring, with the liquid temperature held at 15° C. The stirring was continued at 15° C. until a viscosity of 1,500 mPa·s was reached. The intended coating liquid (S-1) was thus obtained. In the coating liquid (S-1), the molar ratio between aluminum atoms and phosphorus atoms, as expressed by aluminum atoms:phosphorus atoms, was 1.15:1.00.

<Synthesis Example of Organic Phosphorus Compound (BO-1)>

Under a nitrogen atmosphere, 60 mL of a toluene solution containing 0.52 mmol of tert-butyllithium was cooled to −78° C., and 26 mmol of dimethyl vinylphosphonate was added to the cooled solution. With the temperature maintained at −78° C., the solution was stirred for 12 hours to cause polymerization, followed by temperature increase up to room temperature (25° C.) and then by addition of 1.0 mL of methanol. The solvent was removed by distillation, followed by reprecipitation with a 1/1 tetrahydrofuran/hexane solution. The precipitate was collected by filtration and then vacuum-dried at 50° C. for 24 hours to obtain a polymer product. The polymer product obtained was then added to 10 mL of a 14 N hydrochloric acid solution, which was refluxed for 12 hours. The resulting solution was diluted with 10 mL of water, and the dilution was filtered using "Spectra/Por" (registered trademark), a cellulose membrane manufactured by Spectrum Laboratories, Inc. Water was removed from the filtrate by distillation, followed by vacuum drying at 50° C. for 24 hours, thus giving a polymer (BO-1). The polymer (BO-1) was poly(vinylphosphonic acid). As a result of GPC analysis, the number-average molecular weight of the polymer was determined to be 7,500 on a polyethylene glycol-equivalent basis. As a result of inductively coupled plasma mass spectrometry, the polymer was found to contain lithium ions derived from the initiator in an amount of 0.9 mol % relative to the amount of phosphonic acid groups.

<Synthesis Example of Organic Phosphorus Compound (BO-2)>

Under a nitrogen atmosphere, 10 g of vinylphosphonic acid and 0.025 g of 2,2'-azobis(2-amidinopropane) dihydrochloride were dissolved in 5 g of water, and the resulting solution was stirred at 80° C. for 3 hours. After being cooled, the polymer solution was diluted by addition of 15 g of water and then filtered using "Spectra/Por" (registered trademark), a cellulose membrane manufactured by Spectrum Laboratories, Inc. Water was removed from the filtrate by distillation, followed by vacuum drying at 50° C. for 24 hours, thus giving a polymer (BO-2). The polymer (BO-2) was poly(vinylphosphonic acid). As a result of GPC analysis, the number-average molecular weight of the polymer was determined to be 10,000 on a polyethylene glycol-equivalent basis.

<Production Example of Coating Liquid (T-1)>

An amount of 1 part by weight of the polymer(BO-1) of the above synthesis example was added and dissolved in a mixture of 69.3 parts by weight of water and 29.7 parts by weight of methanol to obtain the intended coating liquid (T-1).

<Production Example of Coating Liquid (T-2)>

An amount of 1 part by weight of the polymer (BO-2) of the above synthesis example was added and dissolved in a mixture of 69.3 parts by weight of water and 29.7 parts by weight of methanol to obtain the intended coating liquid (T-2).

<Production Example of Coating Liquid (T-3)>

An amount of 1 part by weight of the polymer (BO-2) of the above synthesis example and lithium chloride as the ionic compound (Za) were added and dissolved in a mixture of 69.3 parts by weight of water and 29.7 parts by weight of methanol so that the amount of lithium ions would be 2.2 mol % relative to the amount of phosphonic acid groups. In this way, the intended coating liquid (T-3) was obtained.

Example 1

First, "Lumirror (registered trademark) P60" (thickness: 12 μm) manufactured by TORAY INDUSTRIES, INC., which is an oriented polyethylene terephthalate film, was prepared as the base (X) (this film may be simply referred to as "X-1" hereinafter). The coating liquid (S-1) was applied onto the base using a bar coater so that the dry thickness would be 0.3 μm. The film of the applied liquid was dried at 110° C. for 5 minutes and then heat-treated at 160° C. for 1 minute to form a precursor layer of a layer (Y1-1) on the base. Subsequently, the coating liquid (T-1) was applied using a bar coater in such a manner that the ratio $W_{BO}/W_{BI}$ between the weight $W_{BI}$ of the inorganic phosphorus compound (BI) and the weight $W_{BO}$ of the organic phosphorus compound (BO) would be 0.90/99.10, and the applied liquid was dried at 110° C. for 3 minutes. This was followed by heat treatment at 220° C. for 1 minute to form the layer (Y1-1). In this way, a multilayer structure (1-1) having a configuration of "base (X-1)/layer (Y1-1)" was obtained. The respective thicknesses of the layers of the multilayer structure (1-1) obtained were measured by the method described above. The result is shown in Table 1.

As a result of measurement of the infrared absorption spectrum of the multilayer structure (1-1), the maximum absorption wavenumber in the region from 800 to 1,400 $cm^{-1}$ was determined to be 1,108 $cm^{-1}$, and the width at half maximum of the maximum absorption band was determined to be 37 $cm^{-1}$.

An adhesive layer was formed on the multilayer structure (1-1) as obtained above, and an oriented nylon film (of 15 μm thickness) was laminated on the adhesive layer to obtain a layered product. Next, an adhesive layer was formed on the oriented nylon film of the layered product, then a non-oriented polypropylene film (of 70 μm thickness) was laminated on the adhesive layer, and the resulting laminate was allowed to stand at 40° C. for 5 days for aging. In this way, a multilayer structure (1-2) having a configuration of "base (X-1)/layer (Y1-1)/adhesive layer/oriented nylon film/adhesive layer/non-oriented polypropylene film" was obtained. The oriented nylon film used was "ONBC" (product name) of "EMBLEM" (registered trademark) manufactured by UNITIKA LTD. The non-oriented polypropylene film used was "RXC-21" (product name) manufactured by Tohcello Co., Ltd. The two adhesive layers were each formed by applying a two-component adhesive using a bar coater in such a manner that the dry thickness would be 3 μm and then by drying the adhesive. The two-component adhesive used was a two-component reactive polyurethane adhesive composed of "A-520" (product name) of "TAKELAC" (registered trademark) manufactured by Mitsui Chemicals, Inc. and "A-50" (product name) of "TAKENATE" (registered trademark) manufactured by Mitsui Chemicals, Inc. The oxygen transmission rate and moisture permeability of the multilayer structure (1-2) were measured. The results are shown in Table 1.

The multilayer structure (1-2) was heat-sealed to form a pouch, and the pouch was filled with 100 g of water. The pouch obtained was then subjected to retorting (hot water retaining method) under the following conditions.

Retorting apparatus: Flavor Ace RSC-60, manufactured by HISAKA WORKS, LTD.
Temperature: 130° C.
Time: 30 minutes
Pressure: 0.21 MPaG Immediately after the hot water treatment, a measurement sample was cut out from the pouch, and the oxygen transmission rate and moisture permeability of the sample were measured by the methods previously described. In addition, the pouch was dried at 23° C. and 50% RH for 24 hours after the hot water treatment. Subsequently, a measurement sample was cut out from the dried pouch, and the T-peel strength of the sample was measured by the method previously described. No appearance defect such as delamination was observed.

Example 2

A multilayer structure (2-2) was fabricated and evaluated in the same manner as the multilayer structure (1-2) of Example 1, except for using the coating liquid (T-3) instead of the coating liquid (T-1). As in Example 1, no appearance defect such as delamination was observed.

Examples 3 to 8

Multilayer structures (3-2) to (8-2) were fabricated and evaluated in the same manner as the multilayer structure (1-2) of Example 1, except for using the coating liquid (T-3) instead of the coating liquid (T-1) and changing the type and amount of the metal ion contained in the coating liquid (T-3) according to Table 1. As in Example 1, no appearance defect such as delamination was observed.

Comparative Example 1

A multilayer structure (C1-1) of Comparative Example 1 was fabricated in the same manner as in the fabrication of the multilayer structure (1-1) of Example 1, except for using the coating liquid (T-2) instead of the coating liquid (T-1). A multilayer structure (C1-2) was fabricated in the same manner as in the fabrication of the multilayer structure (1-2) of Example 1, except for substituting the multilayer structure (C1-1) for the multilayer structure (1-1). The multilayer structure obtained was evaluated.

Comparative Example 2

A multilayer structure (C2-1) of Comparative Example 2 was fabricated in the same manner as in the fabrication of the multilayer structure (1-1) of Example 1, except for using the coating liquid (T-3) instead of the coating liquid (T-1) and changing the lithium ion content in the coating liquid (T-3) according to Table 1. A multilayer structure (C2-2) was fabricated in the same manner as in the fabrication of the multilayer structure (1-2) of Example 1, except for substituting the multilayer structure (C2-1) for the multilayer structure (1-1). The multilayer structure obtained was evaluated.

Comparative Example 3

When the coating liquid (T-3) was used instead of the coating liquid (T-1) and the lithium ion content in the coating liquid (T-3) was changed according to Table 1, a white solid was precipitated from the coating liquid (T-3). For this reason, the fabrication of a multilayer structure was impossible.

The conditions of production of the multilayer structures of Examples and Comparative Examples are shown in Table 1.

TABLE 1

| | | Layer (Y) | | | | | | Oxygen transmission rate (mL/(m² · day · atm)) | | Moisture permeability (g/(m² · day)) | | Peel strength |
|---|---|---|---|---|---|---|---|---|---|---|---|---|
| | Base (X) | Coating liquid (S) No. | Thickness (μm) | Coating liquid (T) No. | BO | $W_{BO}/W_{BI}$ | Metal ion (Z) Type | Content (mol %) | Before retorting | After retorting | Before retorting | After retorting | After retorting (g/15 mm) |
| Example 1 | X-1 | S-1 | 0.3 | T-1 | PVPA | 0.90/99.10 | Li$^+$ | 0.9 | 0.20 | 0.21 | 0.2 | 0.2 | 140 |
| Example 2 | X-1 | S-1 | 0.3 | T-3 | PVPA | 0.90/99.10 | Li$^+$ | 2.2 | 0.18 | 0.21 | 0.2 | 0.2 | 130 |
| Example 3 | X-1 | S-1 | 0.3 | T-3 | PVPA | 0.90/99.10 | Li$^+$ | 6.7 | 0.22 | 0.20 | 0.2 | 0.2 | 200 |
| Example 4 | X-1 | S-1 | 0.3 | T-3 | PVPA | 0.90/99.10 | Mg$^{2+}$ | 2.2 | 0.20 | 0.20 | 0.2 | 0.2 | 140 |
| Example 5 | X-1 | S-1 | 0.3 | T-3 | PVPA | 0.90/99.10 | Zn$^{2+}$ | 2.2 | 0.21 | 0.22 | 0.2 | 0.2 | 110 |
| Example 6 | X-1 | S-1 | 0.3 | T-3 | PVPA | 0.90/99.10 | Mn$^{2+}$ | 2.2 | 0.21 | 0.22 | 0.2 | 0.3 | 120 |
| Example 7 | X-1 | S-1 | 0.3 | T-3 | PVPA | 0.90/99.10 | Ca$^{2+}$ | 2.2 | 0.20 | 0.21 | 0.2 | 0.2 | 130 |
| Example 8 | X-1 | S-1 | 0.3 | T-3 | PVPA | 0.90/99.10 | Fe$^{2+}$ | 2.2 | 0.19 | 0.19 | 0.2 | 0.2 | 110 |
| Comparative Example 1 | X-1 | S-1 | 0.3 | T-2 | PVPA | 0.90/99.10 | — | 0.0 | 0.21 | 0.22 | 0.2 | 0.2 | 20 |
| Comparative Example 2 | X-1 | S-1 | 0.3 | T-3 | PVPA | 0.90/99.10 | Li$^+$ | 0.2 | 0.19 | 0.20 | 0.2 | 0.2 | 20 |
| Comparative Example 3 | X-1 | S-1 | 0.3 | T-3 | PVPA | — | Li$^+$ | 9.0 | N/A | N/A | N/A | N/A | N/A |

[Abbreviations in the table]
—: Not evaluated (Not contained)
N/A: Not measurable

Example 9

In Example 9, a vacuum insulator was fabricated using the multilayer structure (1-2) as obtained in Example 1. Specifically, the multilayer structure (1-2) was first cut into two pieces of a given shape. The two pieces of the multilayer structure (1-2) were then stacked together in such a manner that the non-oriented polypropylene layers were located interiorly, and the resulting rectangular stack was heat-sealed at its three sides to form a bag. Next, a heat-insulating core material was put into the bag through the opening of the bag, and the bag was hermetically closed using a vacuum packaging machine (VAC-STAR 2500, manufactured by Frimark GmbH) so that the internal pressure was 10 Pa at a temperature of 20° C. In this way, a vacuum insulator was successfully fabricated without any problem. The heat-insulating core material used was a fine silica powder dried at 120° C. for 4 hours.

Example 10

In Example 10, a solar cell module was fabricated using the multilayer structure (1-1) as obtained in Example 1. Specifically, first, an amorphous silicon solar cell placed on a 10-cm-square tempered glass plate was sandwiched between ethylene-vinyl acetate copolymer films with a thickness of 450 μm. The multilayer structure (1-1) was then bonded onto one of the films in such a manner that the polyethylene terephthalate layer of the multilayer structure (1-1) faced outwardly. In this way, a solar cell module was fabricated. The bonding was accomplished by vacuum drawing at 150° C. for 3 minutes, followed by compression bonding for 9 minutes. The solar cell module thus fabricated operated well and continued to show good electrical output characteristics over a long period of time.

INDUSTRIAL APPLICABILITY

According to the present invention, it is possible to obtain a multilayer structure that not only has good gas barrier properties and good water vapor barrier properties but also is capable of maintaining good gas barrier properties and good water vapor barrier properties even after retorting, has good interlayer adhesion and suffers from no appearance defect such as delamination even after retorting. The use of the multilayer structure of the present invention makes it possible to obtain a good packaging material.

The invention claimed is:

1. A multilayer structure comprising a base (X) and a layer (Y) stacked on the base (X), wherein
the layer (Y) contains an aluminum-containing compound (A) and an organic phosphorus compound (BO), and
the organic phosphorus compound (BO) contains a phosphorus atom-containing functional group and at least one metal ion (Z) selected from ions of metals of Groups 1 to 12 of the periodic table, the content of the metal ion (Z) being 0.4 to 8.0 mol % relative to the content of the phosphorus atom-containing functional group.

2. The multilayer structure according to claim 1, wherein the aluminum-containing compound (A) is a compound (Ab) comprising a reaction product (D) of an aluminum-containing metal oxide (Aa) and an inorganic phosphorus compound (BI).

3. The multilayer structure according to claim 1, wherein a ratio $W_{BO}/W_{BI}$ between a weight $W_{BI}$ of an inorganic phosphorus compound (BI) and a weight $W_{BO}$ of the organic phosphorus compound (BO) in the layer (Y) satisfies a relationship of $0.01/99.99 \leq W_{BO}/W_{BI} < 1.00/99.00$.

4. The multilayer structure according to claim 1, wherein the organic phosphorus compound (BO) is a polymer having at least one functional group selected from the group consisting of a phosphoric acid group, a phosphorous acid group, a phosphonic acid group, a phosphonous acid group, a phosphinic acid group, and a phosphinous acid group.

5. The multilayer structure according to claim 1, wherein the metal ion (Z) is at least one metal ion selected from the group consisting of a lithium ion, a potassium ion, a sodium ion, a magnesium ion, a calcium ion, a manganese ion, an iron ion, a cobalt ion, a nickel ion, a copper ion, and a zinc ion.

6. The multilayer structure according to claim 1, wherein the base (X) comprises at least one layer selected from the group consisting of a thermoplastic resin film layer and a paper layer.

7. A packaging material comprising the multilayer structure according to claim 1.

8. The packaging material according to claim 7, used for a retort food.

9. The multilayer structure according to claim 2, wherein the organic phosphorus compound (BO) is a polymer having at least one functional group selected from the group consisting of a phosphoric acid group, a phosphorous acid group, a phosphonic acid group, a phosphonous acid group, a phosphinic acid group, and a phosphinous acid group, the metal ion (Z) is at least one metal ion selected from the group consisting of a lithium ion, a potassium ion, a sodium ion, a magnesium ion, a calcium ion, a manganese ion, an iron ion, a cobalt ion, a nickel ion, a copper ion, and a zinc ion, the base (X) comprises at least one layer selected from the group consisting of a thermoplastic resin film layer and a paper layer.

* * * * *